US00RE43574E

(19) United States
(12) Reissued Patent
Song et al.

(10) Patent Number: US RE43,574 E
(45) Date of Reissued Patent: *Aug. 14, 2012

(54) FOUR COLOR LIQUID CRYSTAL DISPLAY AND PANEL THEREFOR

(75) Inventors: Keun-Kyu Song, Yongin (KR); Jeong-Ye Choi, Suwon (KR); Nam-Seok Roh, Sungnam (KR); Mun-Pyo Hong, Sungnam (KR); Cheol-Woo Park, Suwon (KR)

(73) Assignee: Samsung Electronics Co., Ltd., Suwon-Si, Gyeonggi-Do (KR)

( * ) Notice: This patent is subject to a terminal disclaimer.

(21) Appl. No.: 11/655,037

(22) Filed: Jan. 18, 2007

Related U.S. Patent Documents

Reissue of:
(64) Patent No.: 6,989,876
Issued: Jan. 24, 2006
Appl. No.: 10/430,353
Filed: May 6, 2003

(30) Foreign Application Priority Data

Nov. 20, 2002 (KR) ..... 10-2002-0072289

(51) Int. Cl.
*G02F 1/1335* (2006.01)
*G02F 1/1343* (2006.01)

(52) U.S. Cl. ..... 349/109; 349/108; 349/144; 349/145; 349/146; 349/106

(58) Field of Classification Search ..... 349/109, 349/145, 146, 106, 107, 108
See application file for complete search history.

(56) References Cited

U.S. PATENT DOCUMENTS

| | | | | |
|---|---|---|---|---|
| 3,824,609 | A | 7/1974 | Tevick | |
| 4,892,391 | A | 1/1990 | Stewart et al. | |
| 4,986,637 | A * | 1/1991 | Yamaguchi | 349/109 |
| 5,563,621 | A * | 10/1996 | Silsby | 345/43 |
| 5,859,683 | A * | 1/1999 | Tagusa et al. | 349/138 |
| 5,899,550 | A * | 5/1999 | Masaki | 349/109 |
| 5,946,114 | A | 8/1999 | Loiseaux et al. | |
| 6,147,728 | A * | 11/2000 | Okumura et al. | 349/106 |
| 6,335,719 | B1 | 1/2002 | An et al. | |
| 6,335,721 | B1 | 1/2002 | Jeong | |

(Continued)

FOREIGN PATENT DOCUMENTS

JP 64-059318 3/1989

(Continued)

OTHER PUBLICATIONS

Machine translation of JP 2002-006303, which was made of record by the applicant.*

*Primary Examiner* — Mark A Robinson
*Assistant Examiner* — Dennis Y Kim
(74) *Attorney, Agent, or Firm* — F. Chau & Associates, LLC

(57) ABSTRACT

A liquid crystal display is provided, which includes a liquid crystal panel assembly including a plurality of red, green, blue and white pixel areas, and a backlight unit placed at a side of the liquid crystal panel assembly. The light emitted from the backlight unit has a color coordinate (x, y) where x ranges from about 0.31 to about 0.34, and y ranges from about 0.32 to about 0.35.

22 Claims, 14 Drawing Sheets

U.S. PATENT DOCUMENTS

| | | | | |
|---|---|---|---|---|
| 6,365,916 | B1 | 4/2002 | Zhong et al. | |
| 2002/0003594 | A1* | 1/2002 | Ishii et al. | 349/65 |
| 2003/0071943 | A1* | 4/2003 | Choo et al. | 349/106 |
| 2004/0051724 | A1* | 3/2004 | Elliott et al. | 345/694 |
| 2004/0169807 | A1* | 9/2004 | Rho et al. | 349/139 |
| 2005/0068477 | A1* | 3/2005 | Shin et al. | 349/106 |
| 2005/0162600 | A1* | 7/2005 | Rho et al. | 349/139 |

FOREIGN PATENT DOCUMENTS

| | | |
|---|---|---|
| JP | 01-262525 | 10/1989 |
| JP | 02-005083 | 1/1990 |
| JP | 02-097903 | 4/1990 |
| JP | 02-245733 | 10/1990 |
| JP | 05-045645 | 2/1993 |
| JP | 05-088011 | 4/1993 |
| JP | 05-181131 | 7/1993 |
| JP | 06186575 | 7/1994 |
| JP | 07-114018 | 5/1995 |
| JP | 08-211223 | 8/1996 |
| JP | 08-234020 | 9/1996 |
| JP | 08-248410 | 9/1996 |
| JP | 09-138390 | 5/1997 |
| JP | 09230303 | 9/1997 |
| JP | 10-010517 | 1/1998 |
| JP | 10-063203 | 3/1998 |
| JP | 10-246880 | 9/1998 |
| JP | 11-212060 | 8/1999 |
| JP | 11-295717 | 10/1999 |
| JP | 2000-029015 | 1/2000 |
| JP | 2000-111902 | 4/2000 |
| JP | 2000284329 | 10/2000 |
| JP | 2000-330102 | 11/2000 |
| JP | 2000-338323 | 12/2000 |
| JP | 2001-91721 | 4/2001 |
| JP | 2002006303 | 1/2002 |
| JP | 2004-507773 | 3/2004 |
| KR | 0145184 | 4/1998 |
| KR | 1019990074556 | 10/1999 |
| KR | 1020010028222 | 4/2001 |
| KR | 2001-0053493 | 6/2001 |
| KR | 1020010081677 | 8/2001 |
| KR | 1020020012794 | 2/2002 |
| KR | 1020020026100 | 4/2002 |
| KR | 1020030054280 | 7/2003 |
| WO | 02/11112 | 2/2002 |

* cited by examiner

FOUR COLOR LIQUID CRYSTAL DISPLAY AND PANEL THEREFOR

Matter enclosed in heavy brackets [ ] appears in the original patent but forms no part of this reissue specification; matter printed in italics indicates the additions made by reissue.

BACKGROUND OF THE INVENTION (a) Field of the Invention

The present invention relates to a liquid crystal display and a panel therefor, and in particular, to a four color liquid crystal display.

(b) Description of Related Art

Generally, a liquid crystal display (LCD) includes a liquid crystal panel assembly including two panels provided with two kinds of field generating electrodes such as pixel electrodes and a common electrode and a liquid crystal layer with dielectric anisotropy interposed therebetween. The variation of the voltage difference between the field generating electrodes, i.e., the variation in the strength of an electric field generated by the electrodes changes the transmittance of the light passing through the LCD, and thus desired images are obtained by controlling the voltage difference between the electrodes.

The LCD includes a plurality of pixels with pixel electrodes and red (R), green (G) and blue (B) color filters. The pixels are driven to perform display operation by way of the signals applied thereto through display signal lines. The signal lines include gate lines (or scanning signal lines) for carrying the scanning signals, and data lines for carrying data signals. Each pixel has a thin film transistor (TFT) connected to one of the gate lines and one of the data lines to control the data signals applied to the pixel electrode.

The usual LCD representing one dot by the three RGB colors pixels involves poor optical efficiency. Specifically, the color filters for the respective RGB pixels transmit only one thirds of the light incident thereupon, and hence, the total optical efficiency is deteriorated.

Meanwhile, there are several types of arrangement of the red (R), green (G) and blue (B) color filters. Examples are a stripe type where the color filters of the same color are arranged in the same pixel columns, a mosaic type where the red, green and blue color filters are arranged in turn along the row and column directions, and a delta type where the pixels are arranged zigzag in the column direction and the red, green and blue color filters are arranged in turn. The delta type correctly represents a circle or a diagonal line.

The ClairVoyante Laboratories has proposed a pixel arrangement called the "PenTile Matrix™," which is advantageous in displaying high resolution images while gives minimized design cost. In such a pixel arrangement, the unit pixel of blue is common to two dots, and the neighboring blue pixels receive the data signals from one data driving IC while being driven by two different gate driving ICs. With the use of the PenTile Matrix pixel structure, the resolution of the ultra extended graphics array (UXGA) level can be realized by way of a display device of the super video graphics array (SVGA) level. Furthermore, the number of low-cost gate driving ICs is increased, but the number of high-cost data driving ICs is decreased. This minimizes the production cost for the display device.

However, with the PenTile Matrix pixel structure, as the size of the blue pixel is different from the size of the red and the green pixels, it is required to make alteration of the storage capacity due to the difference in the liquid crystal charge rate. Furthermore, as two blue pixels are driven by way of one line, the pixel polarities are non-uniformly made.

Particularly, as the blue pixels are arranged in the shape of a stripe, the vertical line patterns due to the blue pixels become easily visible with the insufficient resolution, and this deteriorates the total image quality.

SUMMARY OF THE INVENTION

A liquid crystal display is provided, which includes: a liquid crystal panel assembly including a plurality of red, green, blue and white pixel areas; and a backlight unit placed at a side of the liquid crystal panel assembly, wherein light emitted from the backlight unit has a color coordinate (x, y) where x ranges from about 0.31 to about 0.34, and y ranges from about 0.32 to about 0.35.

The liquid crystal panel assembly includes: a first insulating substrate; a plurality of thin film transistors formed on the first insulating substrate; a plurality of pixel electrodes formed on the first insulating substrate and connected to the thin film transistors; a second insulating substrate facing the first insulating substrate; a black matrix formed on the second insulating substrate and defining the pixel areas; red, green and blue color filters formed substantially in the red, green and blue pixel areas, respectively; a common electrode formed on the color filters; and a liquid crystal layer interposed between the first and the second insulating substrates.

The blue pixel area or white pixel area has an area smaller than the red pixel area and the green pixel area.

Preferably, total area of the blue pixel area and the white pixel area is substantially the same as the area of any one of the red pixel area and the green pixel area.

The width of the black matrix near the white pixel area is preferably wider than near the other pixel areas.

A color filter array panel for a liquid crystal display is provided, which includes: an insulating substrate; a black matrix formed on the insulating substrate and defining red, green, blue and white pixel areas; red, green and blue organic filters formed substantially in the red, green and blue pixel areas and containing red, green and blue pigments, respectively; a transparent organic filter formed substantially in the white pixel areas; and a common electrode formed on the organic filters.

The color filter array panel further includes an overcoat located between the organic filters and the common electrode.

The transparent organic filter may include the same material as the overcoat.

It is preferable that the height of a surface of the overcoat is substantially uniform.

A liquid crystal display is provide, which includes: a first insulating substrate; a plurality of thin film transistors formed on the first insulating substrate; a protective layer formed on the thin film transistors and having a protrusion; a plurality of pixel electrodes formed on the protective layer and connected to the thin film transistors; a second insulating substrate facing the first insulating substrate; a black matrix formed on the second insulating substrate and defining red, green, blue and white pixel areas; red, green and blue color filters formed substantially in the red, green and blue pixel areas, respectively; a common electrode formed on the color filters; and a liquid crystal interposed between the first and the second insulating substrates, wherein height of the common electrode is smaller at the white pixel area than at the red, the green and the blue areas, and the protrusion of the protective layer faces the white pixel area.

Preferably, the distance between the common electrode and a surface of the protective layer is substantially uniform.

The pixel electrodes and the common electrode may have cutouts.

A liquid crystal display is provided, which includes: an array of a plurality of sets of pixels, each set including blue and white pixels adjacent to each other, a pair of red pixels obliquely facing each other across the blue and the white pixels, and a pair of green pixels obliquely facing each other across the blue and the white pixels and adjacent to the red pixels, each pixel including a pixel electrode and a thin film transistor; a plurality of gate lines extending in a row direction for transmitting a gate signal to the pixels; and a plurality of data lines extending in a column direction for transmitting data signals to the pixels.

The relative positions of the blue pixel and the white pixel in two sets of pixels adjacent in a column direction or in a row direction are preferably reversed.

According to an embodiment of the present invention, the pixels have rectangular shapes and the blue and the white pixels are arranged in the column direction to form a separate column.

According to another embodiment of the present invention, the blue pixel and the white pixel have triangular shapes to form a diamond shape, and a boundary line between the blue pixel and the white pixel extends in the row direction or the column direction.

It is preferable that the red pixels in adjacent two columns are located in different rows and the red pixels those in adjacent rows are located in different columns, wherein the green pixels in adjacent two columns are placed in different rows and the green pixels in adjacent rows are located in different columns, and wherein either the blue pixels or the white pixels in two sets of pixels adjacent in the row direction are located in different rows, or the blue pixels or the white pixels in two sets adjacent in the column direction are located in different columns.

The liquid crystal display may be driven by rendering.

BRIEF DESCRIPTION OF THE DRAWINGS

The above and other advantages of the present invention will become more apparent by describing preferred embodiments thereof in detail with reference to the accompanying drawings in which:

FIG. 15 is a layout view of a TFT array panel for an LCD having the pixel arrangement shown in FIG. 11 according to an embodiment of the present invention;

FIG. 16 is a sectional view of the TFT array panel shown in FIG. 15 taken along the line XVI-XVI';

FIG. 17 is a layout view of a TFT array panel for an LCD having the pixel arrangement shown in FIG. 12 according to an embodiment of the present invention; and FIG. 18 is a sectional view of the TFT array panel shown in FIG. 17 taken along the line XVIII-XVIII'.

DETAILED DESCRIPTION OF PREFERRED EMBODIMENTS

Figure 1:
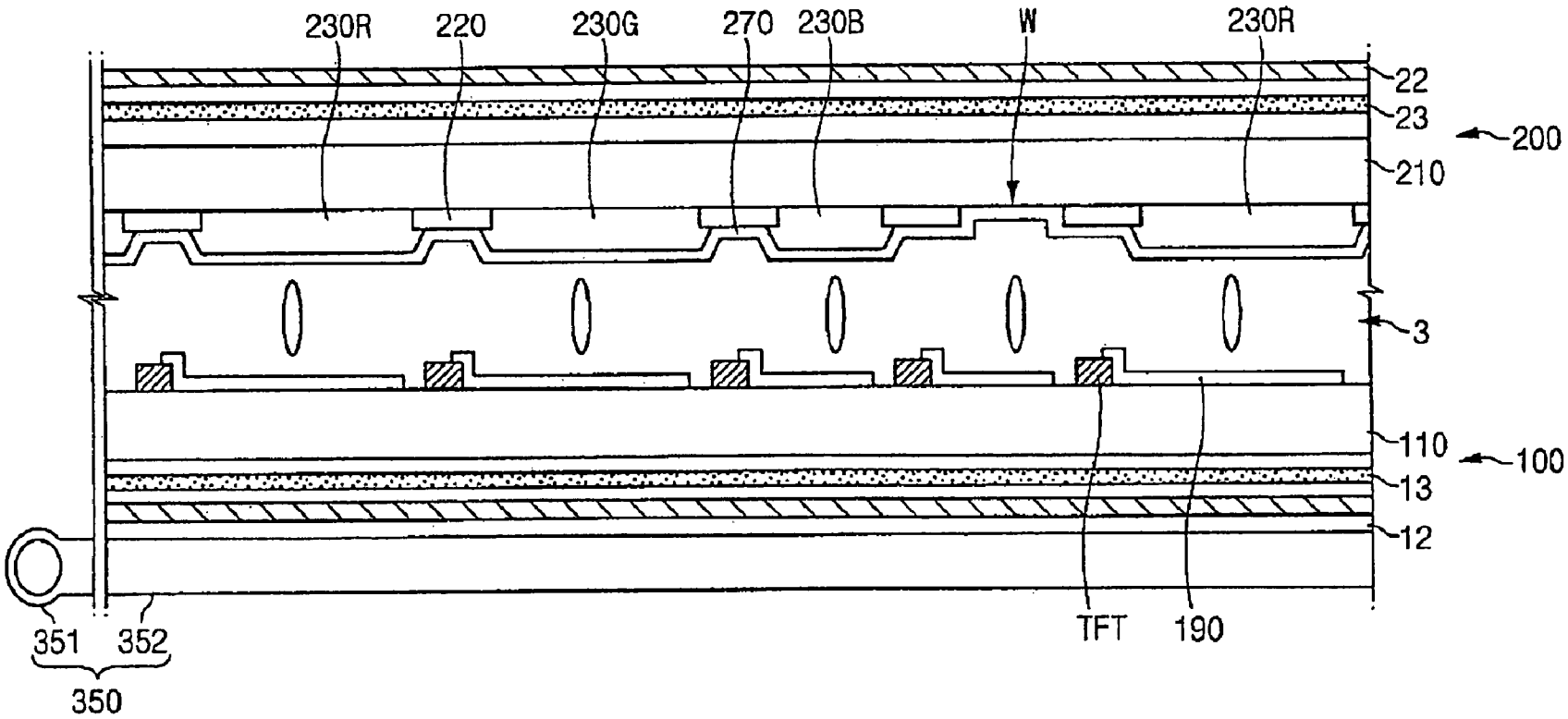
FIG. 1 is a cross sectional view of an LCD according to an embodiment of the present invention.

The present invention now will be described more fully hereinafter with reference to the accompanying drawings, in which preferred embodiments of the inventions are shown.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Now, LCDs according to embodiments of this invention will be described in detail with reference to the accompanying drawings.

FIG. 1 is a cross sectional view of an LCD according to an embodiment of the present invention, and FIGS. 2 to 5 illustrate color filter arrangements of LCDs according to embodiments of the present invention.

As shown in FIG. 1, the LCD includes a lower panel 100, an upper panel 200 facing the lower panel 200, and a liquid crystal layer 3 interposed between the lower and the upper panels and containing liquid crystal molecules aligned in a predetermined direction. The LCD further includes upper and lower polarizers 12 and 22, upper and lower compensation films 13 and 23, and a backlight unit 350. The liquid crystal molecules vary in their orientations under the application of electric fields. The transmittance of the light is changed depending upon the orientations of the liquid crystal molecules.

The lower panel 100 includes a lower substrate 110 preferably made of a transparent insulating material such as glass, a plurality of thin film transistors (TFTs) formed on the lower substrate 110, and a plurality of pixel electrodes 190 connected to the TFTs and preferably made of a transparent conductive material such as indium tin oxide (ITO) and indium zinc oxide (IZO). Each TFT switches data voltages applied to the pixel electrode 190.

The lower compensation film 13 and the lower polarizer 12 are attached to the outer surface of the lower substrate 110. The lower compensation film 13 has biaxiality or uniaxiality. The lower compensation film 13 may be omitted.

The upper panel 200 includes an upper substrate 210 preferably made of a transparent insulating material such as glass, a black matrix 220 defining a plurality of pixel areas arranged in a matrix, a plurality of red, green and blue color filters 230R, 230G and 230B formed in the pixel areas defined by the black matrix 220, and a common electrode 270 preferably made of a transparent conductive material such as ITO and IZO.

The red, green and blue color filters 230R, 230G and 230B are arranged in turn. The pixel areas without any of the red, green and blue color filters 230R, 230G and 230B represent white pixel areas W, which equally intercept or pass all the components of incident light. Since the white pixel area W has no color filter, the inner surface of the color filter panel 200 on the white pixel area W has smaller height than on the other pixel areas R, G and B and the cell gap of the white pixel area W is larger than that at the other pixel areas.

In this specification, the term "pixel" indicates a basic functional element for displaying images, which includes a pixel electrode 190, a portion of the common electrode 270 opposite the pixel electrode 190, a portion of the liquid crystal layer 3 located between the pixel electrode 190 and the corresponding portion of the common electrode 270, a TFT, and a color filter 230R, 230G or 230B. In addition, the term "pixel area" means the area occupied by a pixel. However, for convenience of description, the two terms "pixel" and "pixel area" will not be distinctly used in this specification.

Figure 2:
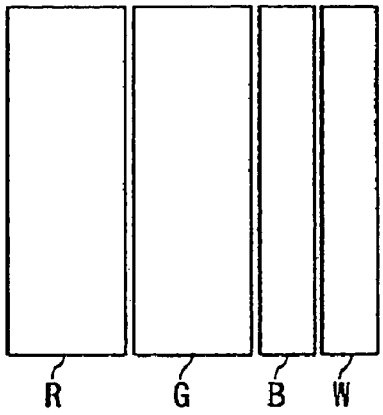
FIGS. 2 to 5 illustrate color filter arrangements for LCDs according to embodiments of the present invention.

Referring to FIG. 2, the numbers of the red, green, blue and white pixels areas R, G, B and W are the same. The red, green, blue and white pixel areas R, G, B and W are arranged in turn along the row direction. Each of the blue pixel areas B and the white pixel areas W has a size equal to about half of each of the red pixel areas R and the green pixel areas G. Therefore, the sum of one white pixel area W and one blue pixel area B is nearly the same as one red pixel area R or one green pixel area G.

Figure 3:
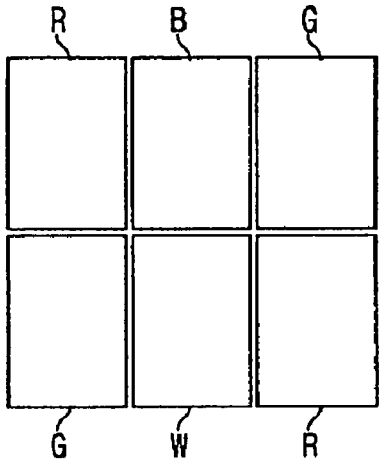

Referring to FIG. 3, a 2×3 pixel matrix including identical pixels forms a dot which is a basic element of an image. The first pixel row includes red, blue and green pixels arranged in sequence, and the second pixel row includes green, white and red pixels arranged in sequence.

Figure 4:
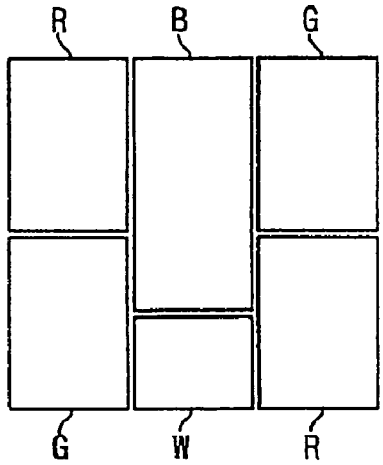

The arrangement of the pixels shown in FIG. 4 is almost the same as that shown in FIG. 3 except that the blue pixel B is enlarged, while the white pixel W is reduced.

Figure 5:
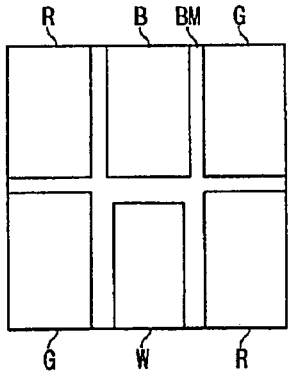

The pixel arrangement shown in FIG. 5 is almost the same as that shown in FIG. 3 except that portions of the black matrix BM surrounding the white pixel W is enlarged to have a width wider than other portions, which is established to hide the disclination lines generated due to the height difference.

The upper compensation film 23 and the upper polarizer 22 are attached to the outer surface of the upper substrate 210. The upper compensation film 23 has biaxiality or uniaxiality. The upper compensation film 23 may be omitted.

The backlight unit 350 is placed at the rear side of the lower polarizer 12. The backlight unit 350 is provided with a light source 351 including a cold cathode tube, and a light guide plate 352.

In this embodiment, since one dot includes red, green, blue and white pixels, the optical efficiency is improved without increasing the total area of the dot.

Assume that the amount of the light passing through the lower polarizer 12 is one.

For a dot including three pixels, i.e., red, green and blue pixels, the area of each pixel is one thirds of the total area of the dot. Since the light transmittance of the color filter is one thirds, the total light transmittance of the dot is equal to $\frac{1}{3}\times\frac{1}{3}+\frac{1}{3}\times\frac{1}{3}+\frac{1}{3}\times\frac{1}{3}=\frac{1}{3}\approx 33.3\%$.

For a dot shown in FIG. 2, the area of each of red and green pixels is one thirds of the total area, while the area of each of blue and white pixels is one sixths of the total area. Since the light transmittance of the white pixel is one, while that of the other pixels is one thirds, the total light transmittance of the dot equals to $\frac{1}{3}\times\frac{1}{3}+\frac{1}{3}\times\frac{1}{3}+\frac{1}{6}\times\frac{1}{3}+\frac{1}{6}\times 1=\frac{4}{9}\approx 44.4\%$. Accordingly, the brightness is increased to be about 1.5 times compared with a conventional three-color LCD.

Although the area of the blue pixel is smaller than the red pixel or the green pixel, the variation of the amount of the blue light is relatively insensitive to a person compared with red and green light, and hence, the influence of the areal reduction on the image quality is relatively small.

However, the areal reduction of the blue pixel gives slight deformation in the images, that is, it makes the images yellowish.

In order to solve such a problem, the light source 351 emits a light with increased blue component to prevent yellowish images.

The light emitted from the light source 351 has a color coordinate (x, y) where x ranges from about 0.31 to about 0.34 and y ranges from about 0.32 to about 0.35. Such a light contains the blue component more than the light emitted from a light source for a conventional LCD backlight. In order to obtain such a light source, the blue color emitting material to be contained in the light source 351 should be increased by a predetermined amount.

Figure 6:
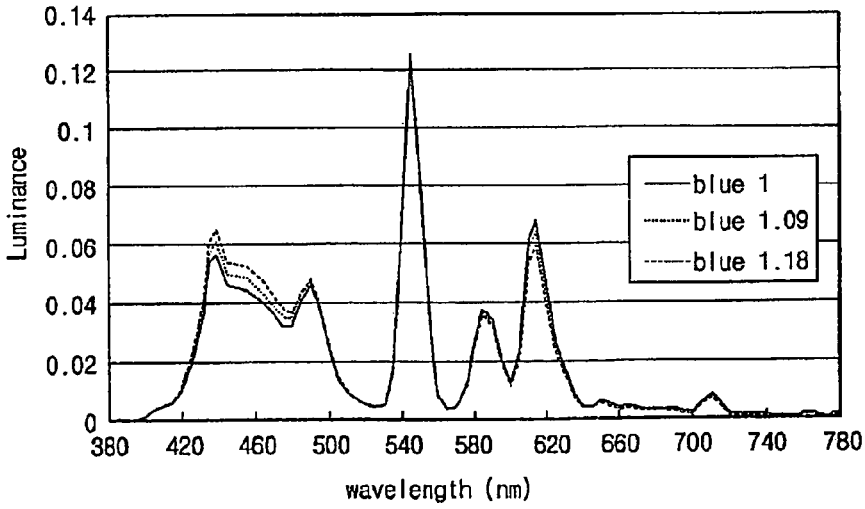
FIG. 6 is a graph showing an exemplary light spectrum of a light source according to an embodiment of the present invention.

FIG. 6 is a graph showing an exemplary light spectrum of a light source according to an embodiment of the present invention. Compared with the curve for a conventional light source represented by "blue 1", the curves represented by "blue 1.09" and "blue 1.18" show enhanced peaks at wavelength in a range of about 440- 470 nm, which indicates blue light, and decreased peaks at wavelength in a range of about 620-650 nm, which indicates red light.

Meanwhile, since the white pixel W has no color filter, the light out of the white pixel W from the light source 531 may look bluish. However, the larger cell gap of the white pixel W, which makes the incident light yellowish, prevents the light from being bluish.

Figure 7:
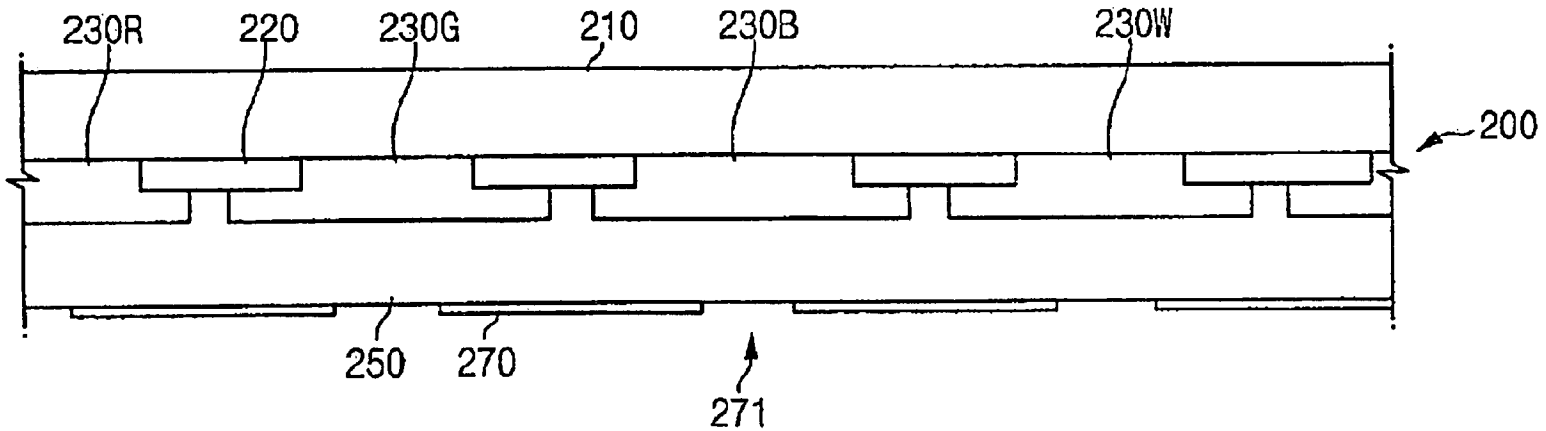
FIGS. 7 and 8 are sectional views of color filter array panels for an LCD according to embodiments of the present invention.
Figure 8:
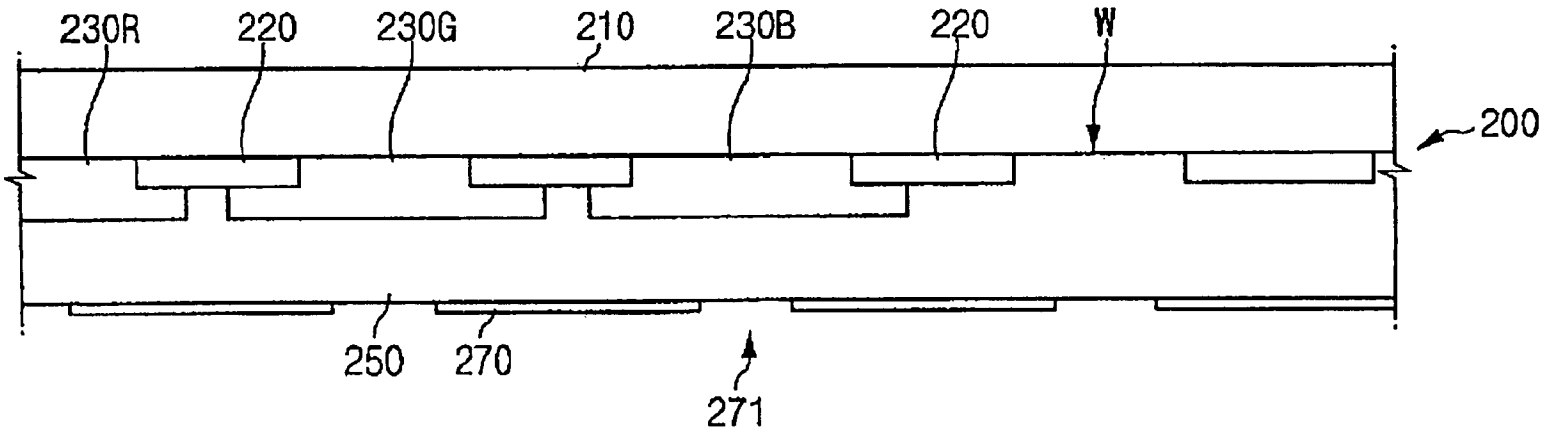

FIGS. 7 and 8 are sectional views of color filter array panels for an LCD according to other embodiments of the present invention.

Referring to FIG. 7, a color filter array panel 200 includes a transparent insulating substrate 210, a black matrix 220 formed on the insulating substrate 210 having a plurality of apertures defining pixel areas, a plurality of red, green, blue and transparent color filters 230R, 230G, 230B and 230W formed in respective pixel areas, an overcoat 250 formed on the color filters 230R, 230G, 230B and 230W, and a common electrode 270 formed on the overcoat 250. It is preferable that the transparent color filters 230W include a transparent organic material such as a photosensitive material without pigment.

A color filter array panel 200 shown in FIG. 8 includes no transparent color filter. Instead, portions of an overcoat 250 in white pixel areas W have larger thickness than other portions thereof to make the height difference of the surface equal to or less than about 0.0.2 microns. Accordingly, the cell gap for all pixels is nearly uniform, and the color filter array panel 200 is manufactured by relatively simple process compared with that shown in FIG. 7 since the step of forming a transparent color filter 230W is omitted.

The color filter array panels 200 shown in FIGS. 7 and 8 reduces step difference between the white pixels W and the other pixels R, G and B by providing the transparent color filters 230W or by increasing the thickness of the overcoat 250 at the white pixels W.

The reduced step difference and the uniform cell gap prevent the yellowish light of the white pixel W and the disclination lines at the steps.

Preferably, the cell gap or the thickness of the liquid crystal layer is equal to about 3.7 microns and the thickness of the color filters is about 1.5 to 1.6 microns.

Figure 9:
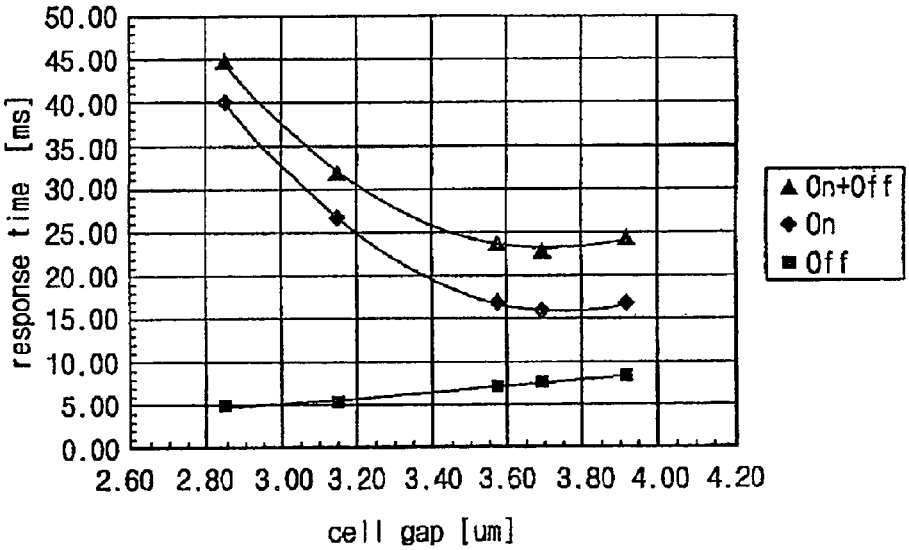
FIG. 9 is a graph illustrating the response time of an LCD as a function of the cell gap thereof.

FIG. 9 is a graph illustrating the response time as a function of the cell gap of an LCD.

In FIG. 9, "on" means the response time of turning on and "off" means the response time of turning off.

As shown in FIG. 9, the response time become reduced as the increase of the cell gap. When the cell gap reaches about 3.7 microns, the response time has a minimum value. As the cell gap goes away from 3.7 microns, the response time becomes increased again.

Figure 10:
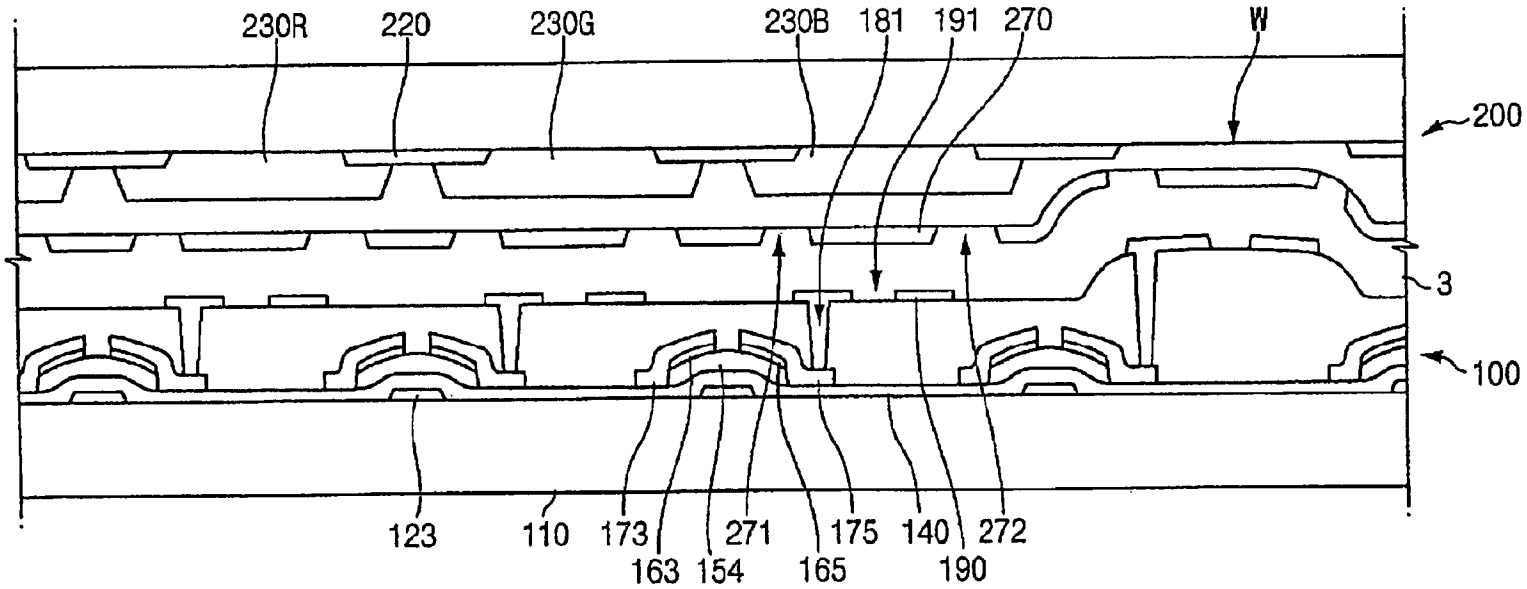
FIG. 10 is a sectional view of an LCD according to another embodiment of the present invention.

FIG. 10 is a sectional view of an LCD according to another embodiment of the present invention.

Referring to FIG. 10, an LCD according to this embodiment includes a TFT array panel 100, a color filter array panel 200, and a liquid crystal layer 3 interposed therebetween.

The color filter array panel 200 includes an upper panel 210 preferably made of a transparent insulating material such as glass, a black matrix 220 formed on the upper panel 210 and defining a plurality of pixel areas arranged in a matrix, a plurality of red, green and blue color filters 230R, 230G and 230B disposed substantially in the pixel areas, an overcoat 250 formed on the color filters 230R, 230G and 230B, and a common electrode 270 preferably made of a transparent conductive material such as ITO and IZO and having a plurality of cutouts 271.

The red, green and blue color filters 230R, 230G and 230B are arranged in turn. The pixel areas without any of the red, green and blue color filters 230R, 230G and 230B represent white pixel areas W, which equally intercept or pass all the components of incident light. Since the white pixel area W has no color filter, the inner surface of the color filter panel 200 on the white pixel area W form a basin.

The TFT array panel 100 includes a plurality of gate electrodes 123 formed on an insulating substrate 110, a gate insulating layer 140 formed on the gate electrodes 123, a plurality of semiconductors 154 preferably made of amorphous silicon formed on the gate insulating layer 140 opposite the gate electrodes 123, a plurality of ohmic contacts 163 and 165 formed on the semiconductors 154, a plurality of source and drain electrodes 173 and 175 respectively formed on the ohmic contacts 163 and 165, a protective layer 180 covering the source and the drain electrodes 173 and 175 and having a plurality of contact holes 181 exposing the drain electrodes 175, and a plurality of pixel electrodes connected to the drain electrodes 175 through the contact holes 181 and having a plurality of cutouts 191. A plurality of gate lines (not shown) connected to the gate electrodes 123 for transmitting scanning signals thereto, and a plurality of data lines (not shown) connected to the source electrodes 173 for transmitting data signals thereto are also provided on the TFT array panel 100.

The surface of the protective layer 180 is protruded at the white pixel W to form a plateau.

The basins of the color filter array panel and the plateaus of the TFT array panel face each other such that the white pixels W have nearly the same cell gap as the other pixels.

The above-described protective layer 180 is formed by photolithography with a photo mask having a translucent area as well as a transparent area and an opaque area. After depositing the protective layer 180 and coating a photoresist film thereon, the photo mask is aligned such that the transparent area and the opaque area face the contact hole 181 and the white pixel area W, while the translucent area faces remaining areas. After exposure and development, a portion of the photoresist film on the contact hole 180 is removed to expose a portion of the protective layer 180, a portion on the white pixel area W is left over, and the other portions have reduced thickness. The contact hole 181 is formed by etching using the photoresist film as an etching mask, and the photoresist film suffers ashing such that the portions of the photoresist film with reduced thickness is removed to expose portions of the protective layer 180. Consequently, the photoresist film is left over only on the white pixel area W. The protective layer 180 is etched using the photoresist film as an etching mask such that the exposed portions of the protective layer 180 are thinned to form a plateau on the white pixel area W.

Meanwhile, a plurality of photolithography steps are introduced in manufacturing the TFT array panel 100, and the use of a photo mask having translucent areas as well as transparent and opaque areas reduce the number of photolithography steps. Several layers having different patterns can be made by using a photoresist film having position-dependent thickness made by using the photo mask. For instance, the semiconductors 154, the ohmic contacts 163 and 165, and the source and the drain electrodes 163 and 165 are formed by using such a photoresist film, and thus, the TFT array panel 100 can be completed using less masks compared with the case using photo masks having only transparent and opaque areas. In this case, the source and the drain electrodes 163 and 165, and the ohmic contacts have substantially the same planar shape, and the semiconductors 154 except for the channel region has substantially the same planar shape as the source and the drain electrodes 163 and 165.

The TFT array panel 100 and the color filter array panel 200 are aligned to be assembled. Thereafter, a liquid crystal material 3 is injected into a gap between the panels 100 and 200 and subject to vertical alignment. A pixel region, which indicates a portion of the liquid crystal layer 3 in a pixel, is partitioned into a plurality of domains by the cutouts 191 and 271 of the pixel electrode 190 and the common electrode 270. The domains are classified into four kinds depending upon the tilt directions of the liquid crystal molecules therein upon application of electric field. The several kinds of the domains give wide viewing angle.

Figure 11:
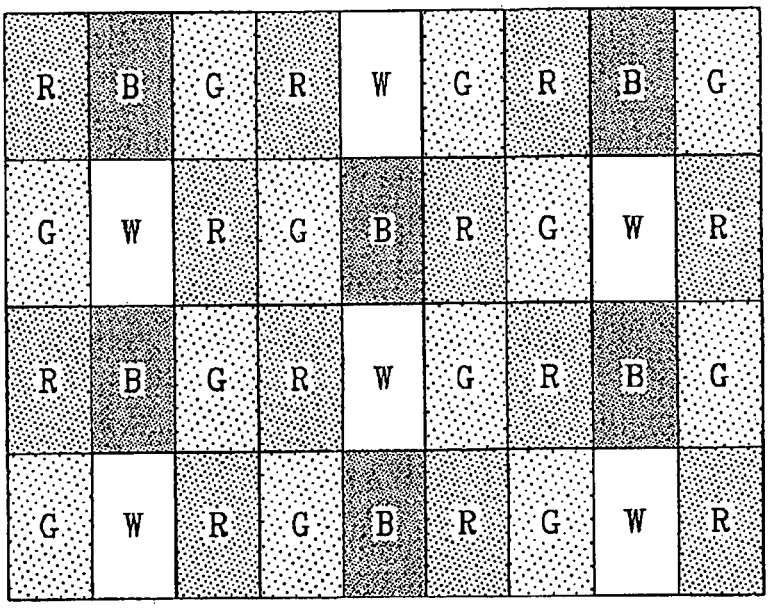
FIGS. 11 to 13 illustrate pixel arrangements of an LCD according to embodiments of the present invention.
Figure 12:
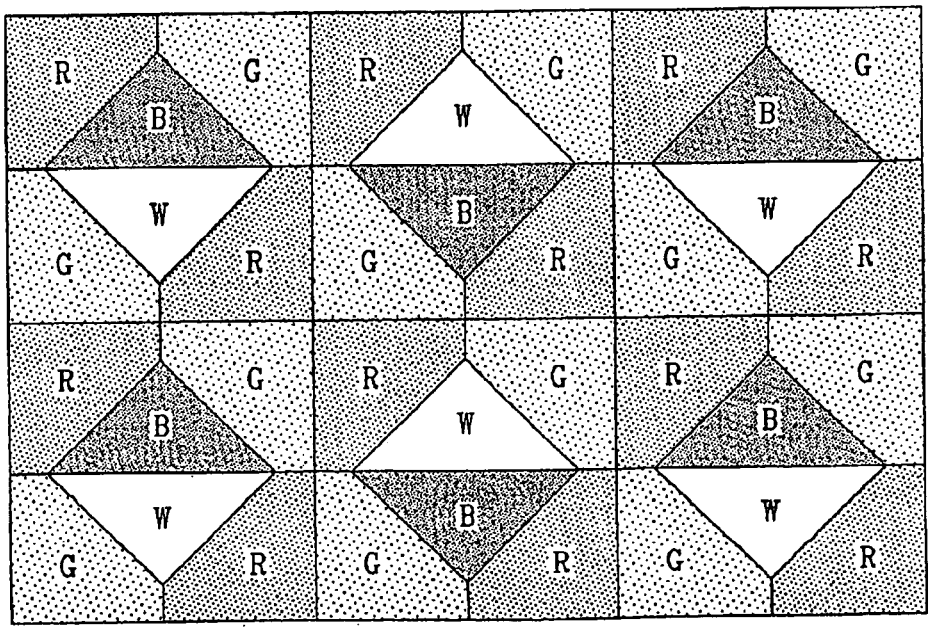
Figure 13:
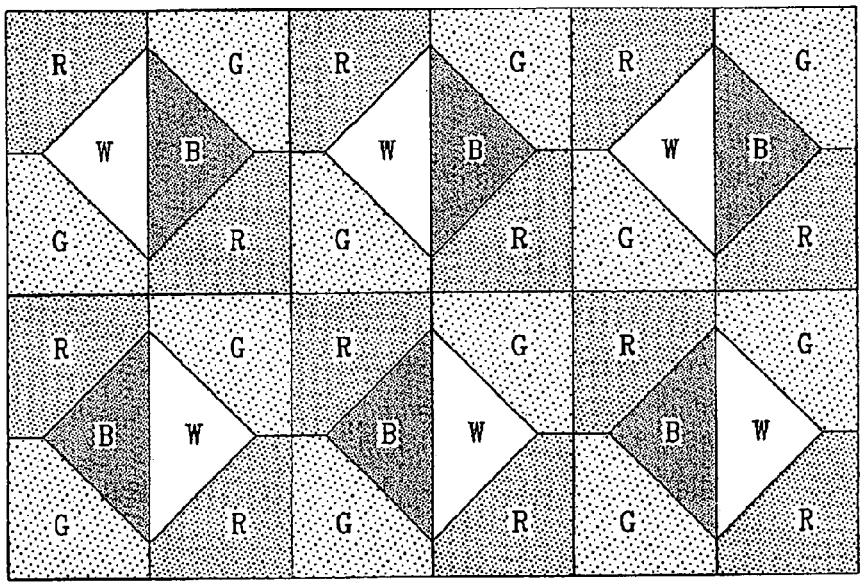

FIGS. 11 to 13 illustrate pixel arrangements for an LCD according to other embodiments of the present invention.

Referring to FIGS. 11 to 13, an LCD according to this embodiment includes red, blue and green pixels R, B and G arranged like a PenTile Matrix and white pixels W adjacent to the blue pixels B.

For a descriptive purpose, it is considered a set of pixels including blue and white pixels B and W adjacent to each other, a pair of red pixels R obliquely facing each other across the blue and the white pixels B and W, and a pair of green pixels G obliquely facing each other across the blue and the white pixels B and W and adjacent to the red pixels R. Then, the pixel arrangements shown in FIGS. 11 to 13 are obtained by repeatedly arranging such sets of pixels. It is noted that the relative positions of the blue pixel B and the white pixel W in two sets of pixels adjacent in a column direction or in a row direction are reversed.

The blue pixel B and the white pixel W shown in FIG. 11 have rectangular shapes as the red and the green pixels R and G and are arranged in the column direction to form a separate column.

Alternatively, the blue pixel B and the white pixel W shown in FIGS. 12 and 13 have isosceles triangular shapes, and a pair of the blue and the white pixels B and W face their bottom sides to form a diamond shape. The blue and the white pixels B and W shown in FIG. 12 are arranged in the column direction, while those shown in FIG. 13 are arranged in a row direction. Accordingly, a boundary line between the blue pixel B and the white pixel W shown in FIG. 12 match the boundary line between the pixel rows, while a boundary line between the blue pixel B and the white pixel W shown in FIG. 13 match the boundary line between the pixel columns.

Referring to FIGS. 11 and 12, the relative positions of the blue pixel B and the white pixel W in two sets of pixels adjacent in the row direction are reversed. However, referring to FIG. 13, the relative positions of the blue pixel B and the white pixel W in two sets of pixels adjacent in the column direction are reversed.

In this arrangement, the red pixels R in adjacent two columns are located in different rows, while those in adjacent rows are located in different columns. Likewise, the green pixels in adjacent two columns are placed in different rows, while those in adjacent rows are located in different columns. In addition, the blue pixels B or the white pixels W in two sets adjacent in the row direction are located in different rows as shown in FIGS. 11 and 12, or alternatively, the blue pixels B or the white pixels W in two sets adjacent in the column direction are located in different columns as shown in FIG. 13. Accordingly, the same color pixels, particularly the blue pixels are arranged in zigzag along the column direction and the row direction.

The LCDs according to these embodiments receive RGB image data from an external data source such as a graphic controller, and extract image data for the white pixels W to drive the four color pixels.

A dot for displaying an image preferably includes an above-described set of pixels including a pair of blue and white pixels B and W, a pair of red pixels R, and a pair of green pixels G.

However, when using rendering, a dot may include a pair of blue and white pixels B and W and a pair of red and green pixels in a column.

In any cases, these pixel arrangements prevent vertical line pattern generated in a conventional LCD where the same color pixels such as blue pixels are arranged in the column direction and the resolution is not sufficiently high. Therefore, an LCD having a PenTile Matrix pixel arrangement realizes improved image quality.

Figure 14:
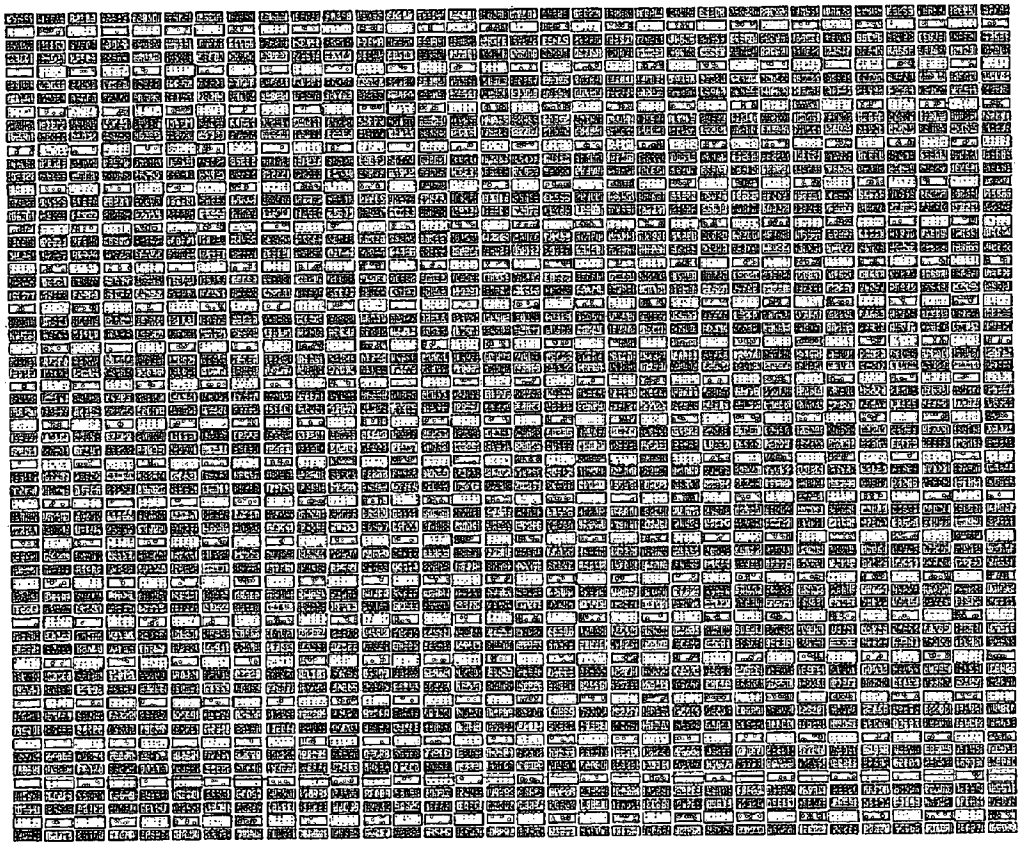
FIG. 14 is a picture for illustrating the visibility of an LCD having the pixel arrangement shown in FIG. 11.

FIG. 14 is a picture for illustrating the visibility of an LCD having the pixel arrangement shown in FIG. 11. As shown in FIG. 14, no vertical line pattern is recognizable.

Exemplary TFT array panels for an LCD having the pixel arrangements shown in FIGS. 11 and 12 will be now described with reference to FIGS. 15 to 18.

Figure 15:
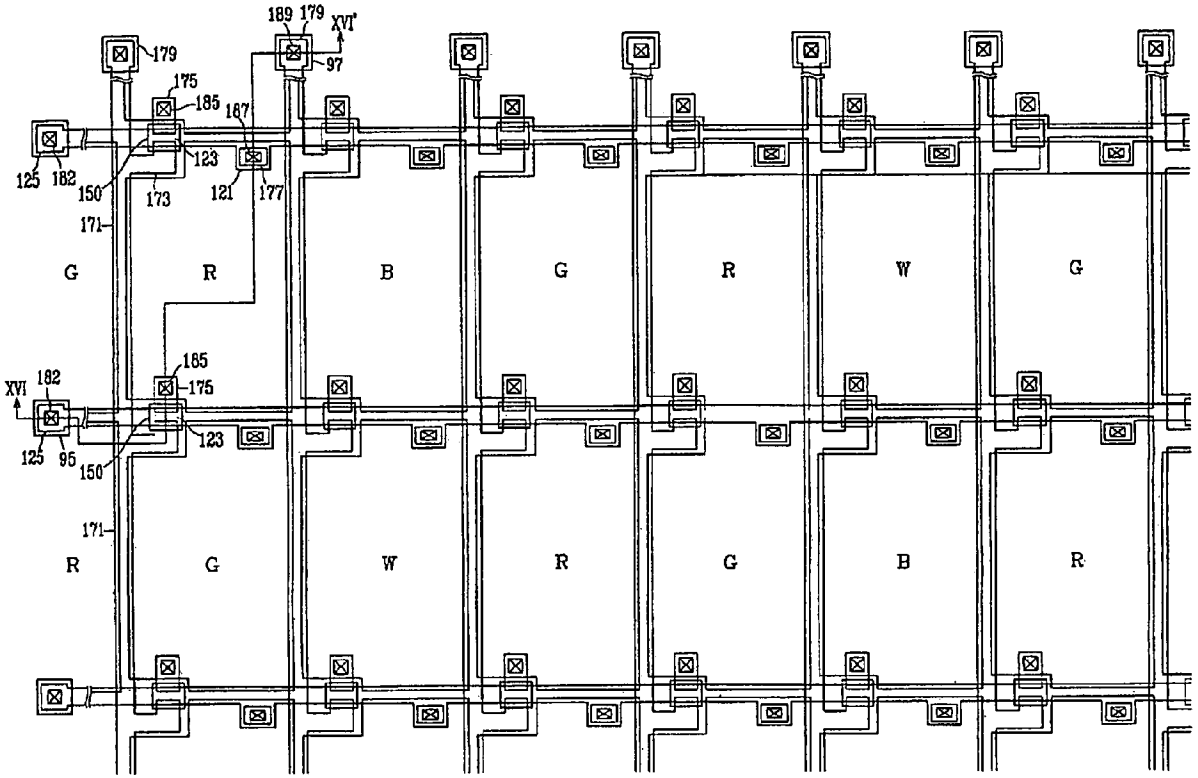
FIGS. 15 and 17 are layout views of TFT array panels for an LCD according to embodiments of the present invention.
Figure 16:
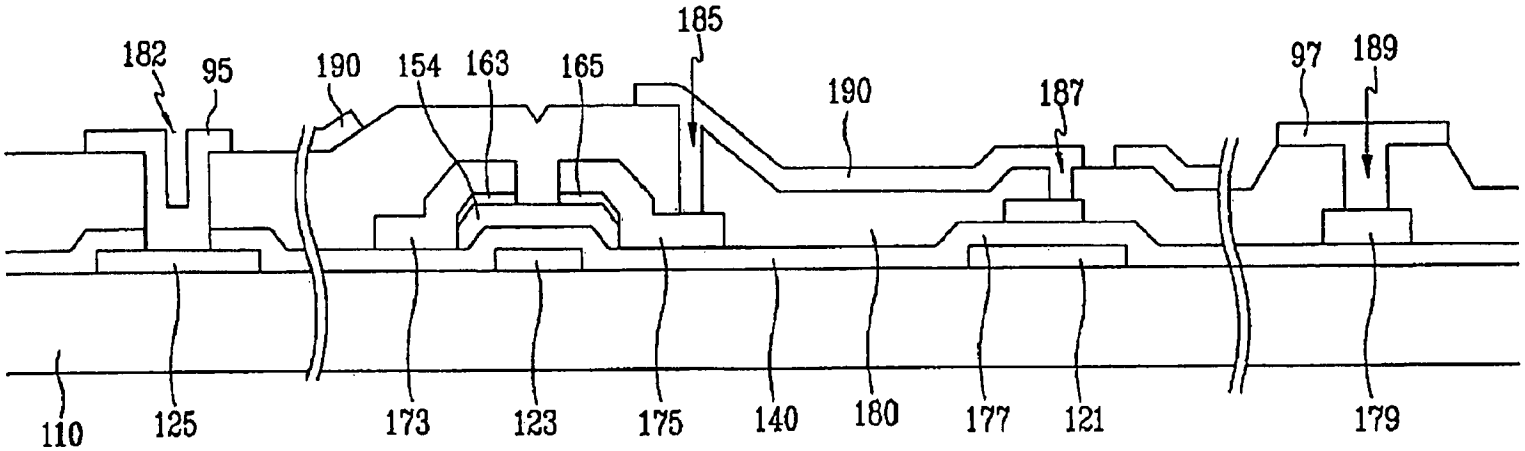
FIGS. 16 and 18 are sectional views of the TFT array panels shown in FIGS. 15 and 17 taken along the lines XVI-XVI' and XVIII-XVIII', respectively.
Figure 17:
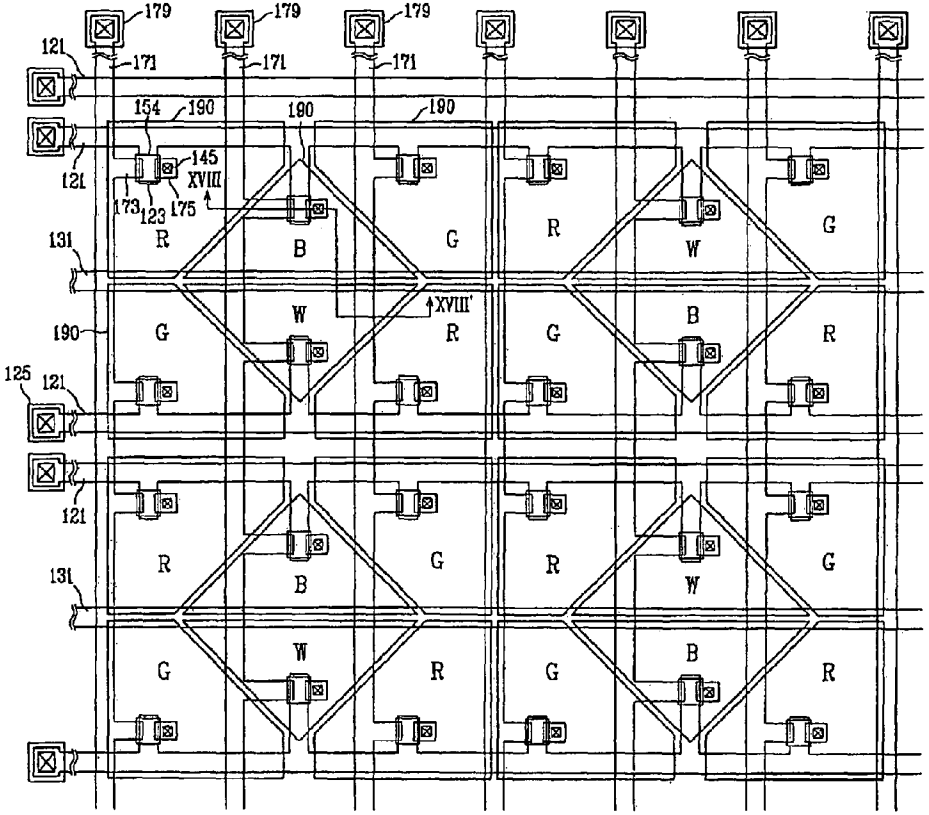
Figure 18:
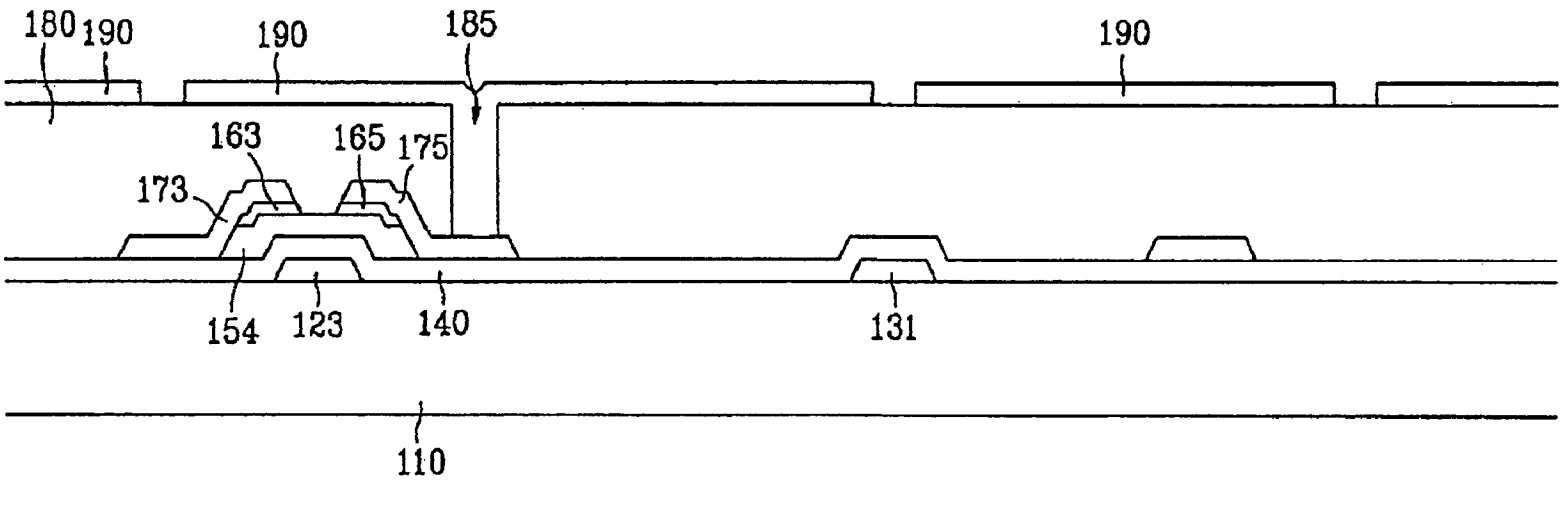

FIGS. 15 and 17 are layout views of TFT array panels for an LCD according to embodiments of the present invention, and FIGS. 16 and 18 are sectional views of the TFT array panels shown in FIGS. 15 and 17 taken along the lines XVI-XVI' and XVIII-XVIII', respectively.

Referring to FIG. 12, LCDs according to these embodiments includes a plurality of red, green, blue and white pixels R, C, B and G arranged in row and column directions.

As shown in the figures, a gate wire is formed on a transparent insulating substrate 110. The gate wire includes a plurality of gate lines 121 extending substantially in the row direction and a plurality of gate electrodes 123 connected to the gate lines 121. An end portion 125 of each gate line 121 is widened for connection with an external circuit.

The gate wire is preferably made of a metal having low resistivity such as aluminum, silver, etc.

A gate insulating layer 140 is formed on the entire surface of the substrate including the gate wire.

A plurality of semiconductor islands 154 preferably made of amorphous silicon are formed on the gate insulating layer 140, and a plurality of ohmic contacts 163 and 165 preferably made of silicide or amorphous silicon heavily doped with n-type impurity are formed on the semiconductor islands 154.

A data wire preferably made of a metal having low resistivity such as aluminum, silver, etc. is formed on the ohmic contacts 163 and 165 and the gate insulating layer 140.

The data wire includes a plurality of data lines 171 extending substantially in the column direction and intersecting the gate lines 121 to define a plurality of pixel areas, a plurality of source electrodes 173 which are branches of the data lines 171 and extending onto to the ohmic contacts 163, and a plurality of drain electrodes 175 separated from the source electrodes 173 and formed on the ohmic contacts 165 opposite the source electrodes 173 with respect to the gate electrodes 123. An end portion 179 of each data line 171 is widened for connection with an external circuit.

A passivation layer 180 is formed on the data wire and exposed portions of the semiconductor islands 154 which are not covered with the data wire. The passivation layer 180 has a plurality of contact holes 185 and 189 exposing the drain electrodes 175 and the end portions 125 of the data lines 171, respectively. The passivation layer 180 and the gate insulating layer 140 have a plurality of contact holes 182 exposing the end portions 125 of the gate lines 121.

A plurality of pixel electrodes 190 and a plurality of contact assistants 95 and 97 are formed on the passivation layer 180. The pixel electrodes 190 are connected to the drain electrodes 175 and the storage electrodes 177 via the contact holes 185 and 187, respectively, and the contact assistants 95 and 97 are connected to the exposed end portions 125 of the gate lines 121 and the exposed end portions 179 of the data lines 171 via the contact holes 182 and 189, respectively. The pixel electrodes 190 and the contact assistants 95 and 97 are preferably made of transparent material such as ITO (indium tin oxide) or IZO (indium zinc oxide).

The gate electrodes 123, the source electrodes 173 and the drain electrodes 175 as well as the semiconductor islands 154 form TFTs.

Referring to FIGS. 15 and 16, each pixel R, G, B and W has an identical rectangular shape as shown in FIG. 11, and the arrangements of the gate lines 121, the gate electrodes 123, the data lines 171, and the source and the drain electrodes 173 and 175 are also identical. The data wire further includes a plurality of storage conductors 177 overlapping the extensions of the gate lines 121, and the passivation layer 180 further has a plurality of contact holes 187 for connection between the pixel electrodes 190 and the storage capacitors 177. Each gate line 121 has a plurality of extensions overlapping the storage electrodes 177 to form storage capacitors.

Referring to FIGS. 17 and 18, the pixel electrodes 190 of the pixels R, G, B and W resemble the shapes of the corresponding pixels shown in FIG. 12. A plurality of storage lines 131 extending substantially parallel to the gate lines 121 and made of the same material as the gate wire are formed on the substrate 110. The gate lines 121 and the storage lines 131 are located near the boundaries of the pixel rows, and the pixel electrodes 190 and the TFTs are symmetrically arranged with respect to the storage lines 131. The storage lines 131 overlap the pixel electrodes 190 adjacent thereto to form a plurality of storage capacitors.

Referring to FIGS. 15 to 18, the pixel electrodes 190 overlap the gate lines 121 and the data lines 171 to give large aperture ratio.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:

a liquid crystal panel assembly including a plurality of red, green, blue and white pixel areas, wherein the blue pixel area has an area smaller than the red pixel area and the green pixel area; and a backlight unit placed at a side of the liquid crystal panel assembly, wherein light emitted from the backlight unit has a color coordinate (x, y) where x ranges from about 0.31 to about 0.34, and y ranges from about 0.32 to about 0.35.

2. The liquid crystal display of claim 1, wherein the liquid crystal panel assembly comprises:

a first insulating substrate;

a plurality of thin film transistors formed on the first insulating substrate;

a plurality of pixel electrodes formed on the first insulating substrate and connected to the thin film transistors;

a second insulating substrate facing the first insulating substrate;

a black matrix formed on the second insulating substrate and defining the pixel areas;

red, green and blue color filters formed substantially in the red, green and blue pixel areas, respectively;

a common electrode formed on the color filters; and a liquid crystal layer interposed between the first and the second insulating substrates.

3. The liquid crystal display of claim 1, wherein the white pixel area has an area smaller than the red pixel area and the green pixel area.

4. The liquid crystal display of claim 1, wherein total area of the blue pixel area and the white pixel area is substantially the same as the area of any one of the red pixel area and the green pixel area.

5. The liquid crystal display of claim 1, wherein the width of the black matrix near the white pixel area is wider than near the other pixel areas.

6. A liquid crystal display comprising:

a liquid crystal panel assembly including a plurality of red, green, blue and white pixels arranged in an array of a plurality of sets of the red, green, blue and white pixels, each set including the blue and the white pixels adjacent to each other, a pair of the red pixels obliquely facing each other across the blue and the white pixels, and a pair of the green pixels obliquely facing each other across the blue and the white pixels and adjacent to the red pixels, each pixel including a pixel electrode and a thin film transistor;

a backlight unit placed at a side of the liquid crystal panel assembly, wherein light emitted from the backlight unit has a color coordinate (x, y) where x ranges from about 0.31 to about 0.34, and y ranges from about 0.32 to about 0.35;

a plurality of gate lines extending in a row direction for transmitting a gate signal to the plurality of red, green, blue and white pixels; and a plurality of data lines extending in a column direction for transmitting data signals to the plurality of red, green, blue and white pixels,

*wherein the blue pixel and the white pixel have triangular shapes*.

7. The liquid crystal display of claim 6, wherein relative positions of the blue pixel and the white pixel in two sets of pixels adjacent in a column direction or in a row direction are reversed.

[8. The liquid crystal display of claim 6, wherein the pixels have rectangular shapes and the blue and the white pixels are arranged in the column direction to form a separate column.]

[9. The liquid crystal display of claim 6, wherein the blue pixel and the white pixel have triangular shapes to form a diamond shape.]

10. The liquid crystal display of claim [9] *6*, wherein a boundary line between the blue pixel and the white pixel extends in the row direction or the column direction.

11. The liquid crystal display of claim 6, wherein the red pixels in adjacent two columns are located in different rows and the red pixels [those] in adjacent rows are located in different columns, wherein the green pixels in adjacent two columns are placed in different rows and the green pixels in adjacent rows are located in different columns, and wherein either the blue pixels or the white pixels in two sets of pixels adjacent in the row direction are located in different rows, or the blue pixels or the white pixels in two sets adjacent in the column direction are located in different columns.

12. The liquid crystal display of claim 6, wherein the liquid crystal display is driven by rendering.

*13. A liquid crystal display comprising:*

*an array of pixels including a first color pixel representing a first color and a second color pixel representing a second color adjacent to each other, a pair of third color pixels each representing a third color and obliquely facing each other across the first color pixel and the second color pixel, and a pair of fourth color pixels each representing a fourth color and obliquely facing each other across the first color pixel and the second color pixel and adjacent to the third color pixels, each pixel including a pixel electrode and a thin film transistor;*

*a plurality of gate lines extending in a row direction for transmitting a gate signal to the pixels; and*

*a plurality of data lines extending in a column direction for transmitting data signals to the pixels,*

*wherein the first color pixel and the second color pixel have triangular shapes,*

*one of the pair of third color pixels has an edge adjacent to an edge of the first color pixel, and the other of the pair of third color pixels has an edge adjacent to an edge of the second color pixel,*

*one of the pair of fourth color pixels has an edge adjacent to an edge of the first color pixel, and the other of the pair of fourth color pixels has an edge adjacent to an edge of the second color pixel, and*

*the first color, the second color, the third color and the fourth color are different from one another.*

*14. The liquid crystal display of claim 13, where in the first color, the second color, the third color, and the fourth color respectively correspond to one of red, green, blue and white.*

*15. The liquid crystal display of claim 14, wherein the first color is white.*

*16. A display device comprising a pixel group comprising two first color pixels, two second color pixels, a third color pixel and a fourth color pixel, the pixel group further comprises a first row of three pixels and a second row of three pixels, the first row and the second row being adjacent to each other in the column direction,*

*wherein the first row comprises one of the two first color pixels, one of the two second color pixels and the third color pixel,*

*the second row comprises the other of the two first color pixels, the other of the two second color pixels and the fourth color pixel,*

*the first color pixel, the second color pixel, the third color pixel and the fourth color pixel represent different colors from each other, and*

*at least one color pixel in each row has a different shape and a different number of edges than the remaining color pixels in the row.*

*17. The display device of claim 16, wherein the first color pixel is a green pixel, the second color pixel is a red pixel, the third color pixel is a blue pixel, and the fourth color pixel is a white pixel, respectively.*

*18. The display device of claim 16, wherein the first color pixel is a red pixel, the second color pixel is a green pixel, the third color pixel is a blue pixel, and the fourth color pixel is a white pixel, respectively.*

*19. A display device comprising:*

*a first pixel group comprising at least two pixels, the first pixel group having a substantially quadrilateral shape including four edges, each of the four edges being oblique with respect to a row direction;*

*a second pixel group substantially surrounding the first pixel group, the second pixel group comprising four pixels adjacent to the four edges of the first pixel group, respectively;*

*a plurality of gate lines extending in a row direction, the plurality of gate lines transmitting a gate signal to the first pixel group and the second pixel group; and*

*a plurality of data lines extending in a column direction, the plurality of data lines transmitting data signals to the first pixel group and the second pixel group,*

*wherein each color of the at least two pixels of the first pixel group is different from each color of the four pixels of the second pixel group, and*

*the four pixels of the second pixel group have at least two colors.*

*20. The display device of claim 19, wherein colors of the at least two pixels of the first pixel group are different from each other.*

*21. The display device of claim 20, wherein a shape of each of the at least two pixels of the first pixel group is triangular.*

*22. The display device of claim 21, wherein a pixel of the first pixel group and two pixels of the second pixel group are arranged in a row direction.*

*23. The display device of claim 20, wherein the colors of the two pixels of the first pixel group include blue and white.*

*24. The display device of claim 20, wherein the colors of the pixels of the second pixel group include red and green.*

* * * * *